United States Patent
Metcalfe et al.

(10) Patent No.: US 7,953,288 B2
(45) Date of Patent: May 31, 2011

(54) EDGE TRANSITION DETECTION IN A HIGH-ADDRESSABLE ERROR DIFFUSION ENVIRONMENT

(75) Inventors: David J. Metcalfe, Marion, NY (US); Yingjun Bai, Pittsford, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 687 days.

(21) Appl. No.: 12/050,212

(22) Filed: Mar. 18, 2008

(65) Prior Publication Data

US 2009/0238489 A1 Sep. 24, 2009

(51) Int. Cl.
*G06K 9/40* (2006.01)
*G06K 15/00* (2006.01)

(52) U.S. Cl. ............ 382/266; 358/3.03

(58) Field of Classification Search .......... 382/190, 382/199, 205, 266, 270, 300; 358/505, 525, 358/3.03
See application file for complete search history.

(56) References Cited

U.S. PATENT DOCUMENTS

| | | | | |
|---|---|---|---|---|
| 4,484,522 A | * | 11/1984 | Simeth | 101/248 |
| 5,642,202 A | * | 6/1997 | Williams et al. | 358/406 |
| 6,328,213 B1 | * | 12/2001 | He et al. | 235/462.25 |
| 7,099,055 B1 | * | 8/2006 | Fischer et al. | 358/487 |
| 7,151,854 B2 | * | 12/2006 | Shen et al. | 382/203 |
| 2008/0056607 A1 | * | 3/2008 | Ovsiannikov | 382/275 |

\* cited by examiner

*Primary Examiner* — Kanji Patel
(74) *Attorney, Agent, or Firm* — Philip E. Blair; Fleit Gibbons Gutman Bongini & Bianco P.L.

(57) ABSTRACT

What is disclosed is a novel system and method for edge transition detection when improve print quality when rendering via high-addressable vector error diffusion in an image processing environment. In order to detect an "ideal" edge and compensate for the adverse effects described in the background hereof, local pixels are detected and local gradient values are calculated and compared against an adjustable threshold to determine the interpolation method needed for that particular pixel. A nearest neighbor interpolation is performed when a local gradient exceeds a predetermined threshold. For example, if the difference between two successive pixels is greater than "200", nearest-neighbor interpolation is used to calculate the intermediate sub-pixel level(s). Otherwise linear interpolation is used. Dynamically switching between these two interpolation schemes significantly improves the integrity and sharpness of the edges. There is no loss of error information distributed to downstream pixels thereby preserving the gray integrity of the input.

6 Claims, 10 Drawing Sheets

EDGE TRANSITION DETECTION IN A HIGH-ADDRESSABLE ERROR DIFFUSION ENVIRONMENT

TECHNICAL FIELD

The present invention is directed to systems and methods for edge transition detection to improve print quality when rendering via high addressable error diffusion in an image processing environment.

BACKGROUND

High-addressable error-diffusion rendering can be used to improve the overall image-quality of scanned documents. High-addressable error-diffusion is a "gray-to-binary" rendering technique that takes advantage of the finer output resolution (write) capabilities of the laser in order to improve the overall image-quality of the rendered output document. The high-addressable algorithm has traditionally used linear interpolation between two successive pixels to generate sub-pixel levels that effectively improve the edge-content of the binarized output. However, a dichotomy exists relative to the optimum interpolation techniques that should be used when processing so-called "perfect" pixel edge-transitions (where nearest-neighbor interpolation is desired) while at the same time processing image regions within the same document that contain smooth/gradual gray video transitions (where linear interpolation is more appropriate). Utilizing linear interpolation effectively blurs perfect edges (0→255/255→0) which results in diffusing a small error term to neighboring pixels. This generates undesirable local (edge) sub-pixels along a hard edge in an image. This has a tendency to blur high transition edges.

Unfortunately, in areas of "ideal" edge transitions, undesirable local "stray" sub-pixels are generated. This tends to degrade the quality of printed documents. For error diffusion image rendering, this edge-degradation has been known to be caused by distributing/diffusing an averaged video error component to its downstream neighborhood pixels. Although video averaging is desirable in scanned documents with mixed content where edge-transitions are less abrupt due to the scanner's modulation-transfer-function (MTF), it tends to cause problems when processing "perfect" edges that are typically encountered within synthetic (i.e. print-path) input images.

Error diffusion is a well-known rendering technique that maintains the gray integrity of the input image by "diffusing" an error component to its downstream neighborhood pixels after video thresholding. In a high-resolution extension to an error diffusion algorithm, intermediate sub-pixels are generated around video edge transitions by using linear interpolation between two successive pixels. This takes advantage of the high-resolution marking capability of the laser (IOT) that generally improves the image-quality of the rendered output.

In a traditional (Floyd & Steinberg) error diffusion algorithm, the generated error component that is diffused to the downstream neighboring pixels is calculated as the difference between the "Desired" and "Printed" values. In this case, the "Desired" value is simply the input gray pixel level, where the "Printed" value is either 255 or 0 (corresponding to an 8-bit input image). For high-addressabilities greater than unity, a pixel's "Printed" value is derived from the number of binary output sub-pixels that are generated, where the "Desired" value is the average gray level between two successive pixels.

The high-addressable error can be calculated as follows:

$$\text{Error} = (\text{Pixel}_{(N)} + \text{Pixel}_{(N+1)})/2 - (\text{PrintedSubpixels} \ast 255)/(\text{TotalSubpixels});$$

TotalSubpixels=1 for 1× high-addressablity. TotalSubpixels=2 for 2× high-addressablity. TotalSubpixels=3 for 3× high-addressablity, and so on.

One way to visualize this error calculation would be to define the area of one binary output pixel to be equivalent to the maximum input gray pixel level (i.e. 255 for an 8-bit image). For high-addressabilities equal to one (i.e. HA=1), generating a "1" after thresholding would consume most of the marked-pixel area with 100% toner. Generating a 0 would produce a 0% fill ("white"). Although high-addressable error-diffusion provides the ability to reduce jagged edges on text and line-art, a problem exists in regions where so-called "perfect" edges are encountered. FIG. 6 illustrates a first video edge transition profile depicting a "perfect" edge, and a second video edge transition profile depicting a "scanned" edge typically encountered in scanned images.

FIG. 7 illustrates a binary input image (2A) and a binary output starburst input image (2B) rendered via a 2× high-addressable error diffusion method (HA=2×) using a bit-constrained software model. In this case, high-addressability is applied in the fast-scan (horizontal direction) only. Note the sporadic placement of sub-pixels on either side of the vertically-oriented lines of output image 2B relative to the 8-bit gray input image 2A.

FIG. 8 illustrates the error component corresponding to the high-addressable rendered output of image 2B. The edge-degradation (observed in image 2B) is the result of the non-zero error being diffused to its neighbor pixels. This error diffusion creates black/white sub-pixels on either side of the vertically-oriented lines. Ideally, the error that should be propagated to the downstream pixels would be zero since the lines only switch between 0 and 255 within the 8-bit gray input image.

What is needed in this art are increasingly sophisticated systems and methods for edge transition detection to improve print quality when rendering via high addressable error diffusion in an image processing environment which does not generate undesirable sub-pixels along a hard edge of the image.

BRIEF SUMMARY

What is provided is a novel system, method, and computer program product for edge transition detection to improve print quality when rendering via high addressable error diffusion in an image processing environment.

In one example embodiment, the present method for edge transition detection in an image processing environment involves scanning an image into a plurality of pixels. A local pixel and a neighbor pixel are identified. An edge transition delta (local gradient) between the local pixel and the neighbor pixel is determined. The edge transition delta is compared against a predetermined edge transition threshold value. A linear interpolation technique is determined if the edge transition delta is less than the predetermined threshold value and an intermediate sub-pixel is calculated using the linear interpolation technique. If the edge transition delta is greater than or equal to the predetermined edge transition threshold then a nearest neighbor interpolation is performed on the local pixel to calculate a sub-pixel. An edge transition is detected based on the determined sub-pixel. Dynamically switching between these two interpolation schemes significantly improves the integrity and sharpness of the edges. Since no loss of error information is distributed to downstream pixels, the gray integrity of the input is preserved.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided is a system and method for edge transition detection to improve print quality when rendering via high addressable vector error diffusion in an image processing environment.

It should be understood that one of ordinary skill in this art would be readily familiar with many facets of color science and related algorithms commonly found in the color science arts. One of ordinary skill in this art would also be readily familiar with various mathematical interpolation techniques used in this art such as linear interpolation and nearest neighbor. One of ordinary skill would be knowledgeable about software and programming systems and methods sufficient to implement the functionality and capabilities described in detail herein in their own hardware environment without undue experimentation.

In order to detect an "ideal" edge and compensate for the adverse effects described in the background hereof, local pixels are detected and local gradient values are calculated and compared against an adjustable threshold to determine the interpolation method needed for that particular pixel. A nearest neighbor interpolation is performed when a local gradient exceeds a predetermined threshold. If, for example, the difference between two successive pixels is greater than (or equal to) the threshold of "200", nearest-neighbor interpolation is used to calculate the intermediate sub-pixel level(s). Otherwise linear interpolation is used to calculate an intermediate sub-pixel. The calculated intermediate sub-pixels are used in edge transition detection. Dynamically switching between two interpolation schemes improves the integrity and sharpness of the edges. Because there is no loss of error information distributed to the downstream pixels, the gray integrity of the input is preserved.

Figure 1:
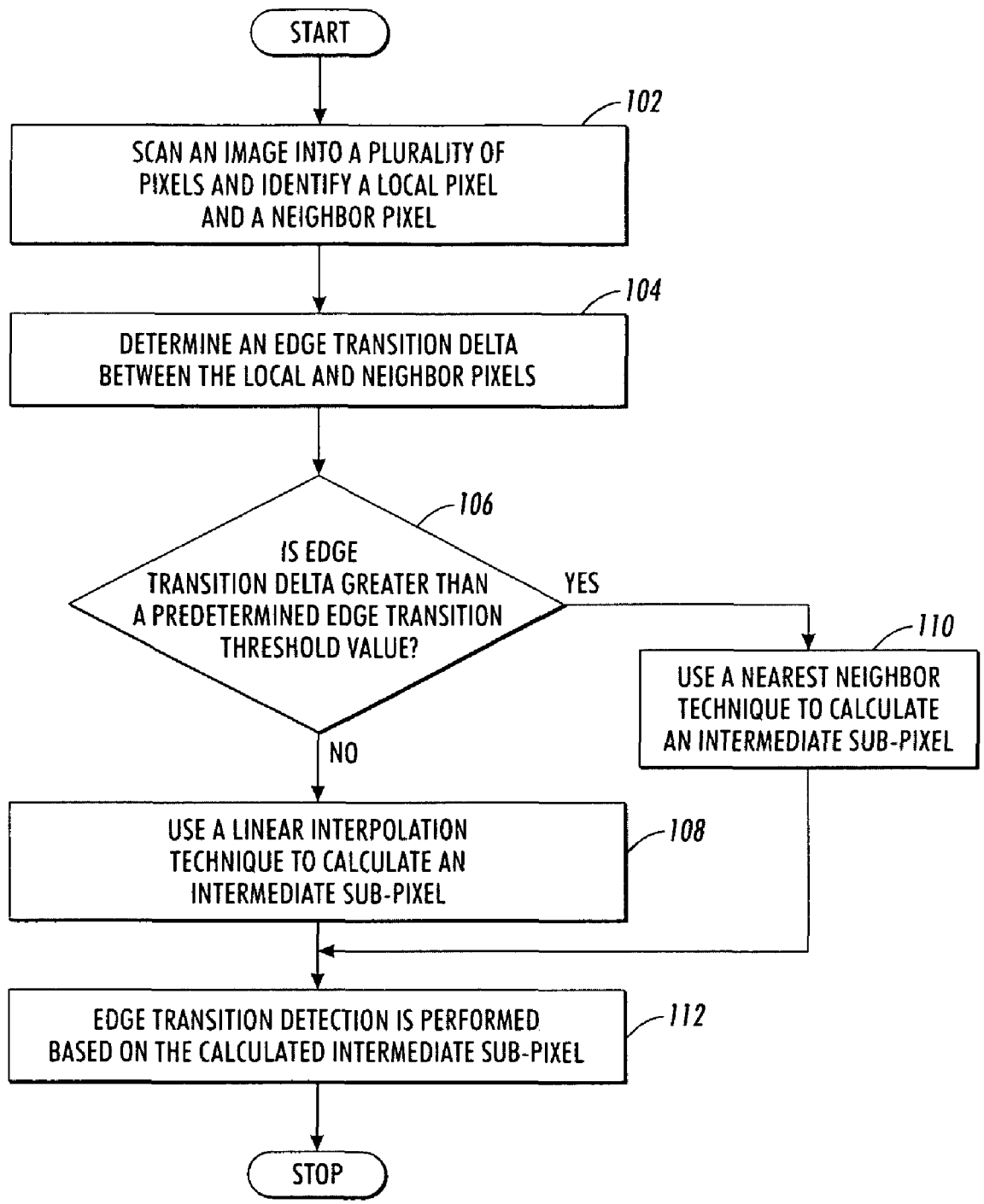
FIG. 1 illustrates one embodiment of the present method for edge transition detection.

Reference is now being made to FIG. 1 which illustrates one embodiment of the present method for edge transition detection to improve print quality when rendering via high-addressable vector error diffusion in an image processing environment.

At step 102, an image is scanned into a plurality of pixels and a local pixel and a neighbor pixel to the local pixel are identified. At step 104, an edge transition delta (local gradient) between the local pixel and the neighbor pixel is determined. At step 106, the edge transition delta is compared against a predetermined edge transition threshold value. A linear interpolation technique is determined if the edge transition delta is less than the predetermined threshold value and, at step 108, an intermediate sub-pixel is calculated using the linear interpolation technique. If the edge transition delta is greater than or equal to the predetermined edge transition threshold, at step 110, a nearest neighbor interpolation is performed on the local pixel to calculate a sub-pixel. At step 112, an edge transition is detected based on the determined sub-pixel.

It should be understood that the flow diagrams depicted herein are illustrative. Other operations, for example, may be added, modified, enhanced, condensed, integrated, or consolidated. Variations thereof are envisioned and are intended to fall within the scope of the appended claims.

Figure 2:
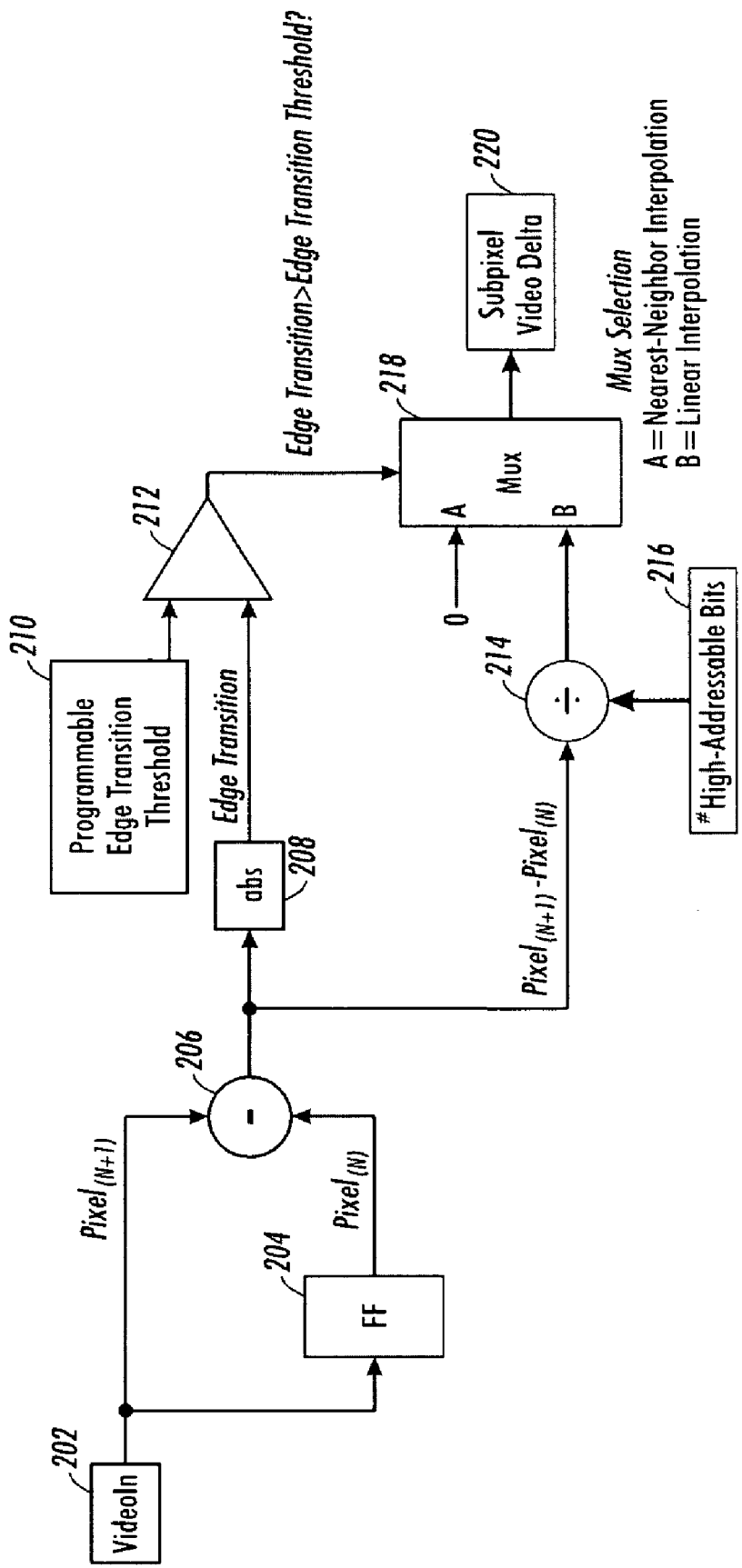
FIG. 2 illustrates a hardware block diagram that calculates a video delta value needed to determine each sub-pixel level(s) as a function of the number of high-addressable bits selected.

Reference is now being made to FIG. 2 which illustrates a block diagram of a system which calculates an output sub-pixel video delta needed to determine each sub-pixel level(s) as a function of the number of high-addressable bits selected. The video signal is processed from left to right assuming a high-addressable output engine of 2 with a programmable edge transition threshold value of 200. Since the high-addressable setting is 2, one interpolated sub-pixel must be calculated for each "base" pixel.

An input video signal (VideoIn) 202 is an 8-bit input image from scanner input or, for example, a postscript file converted to a hardware compatible format. A flip flop (FF) delay 204 delays the local pixel such that a local pixel Pixel$_{(N)}$ can be processed with a neighbor pixel Pixel$_{(N+1)}$. Component 206 determines the edge transition delta between the local pixel and the neighbor pixel by performing a subtraction operation for that cycle. The result of the subtraction is given as: (Pixel$_{(N+1)}$−Pixel$_{(N)}$). Component 208 takes the absolute value of the determined edge transition delta and provides the absolute value into comparator 212 to be compared with the predetermined (programmable) edge transition threshold 210. The output of comparator 212 is a 1 or 0 based on whether the edge transition is greater than the edge transition threshold. The comparator output switches between A/B of mux 218. Component 214 divides the determined edge transition delta by the number of high-addressable bits 216 and provides the output thereof to input B of mux 218 which selects A (nearest neighbor interpolation) or B (linear interpolation) based on the value of the output of comparator 212.

Input A of mux 218 is zero because the default interpolation technique is nearest neighbor. The output of mux 218 is the sub-pixel video delta for local Pixel$_{(N)}$ and neighbor Pixel$_{(N+1)}$.

Attention is directed to FIGS. 3A-3E which collectively illustrate one example of the method hereof.

Figure 3A:
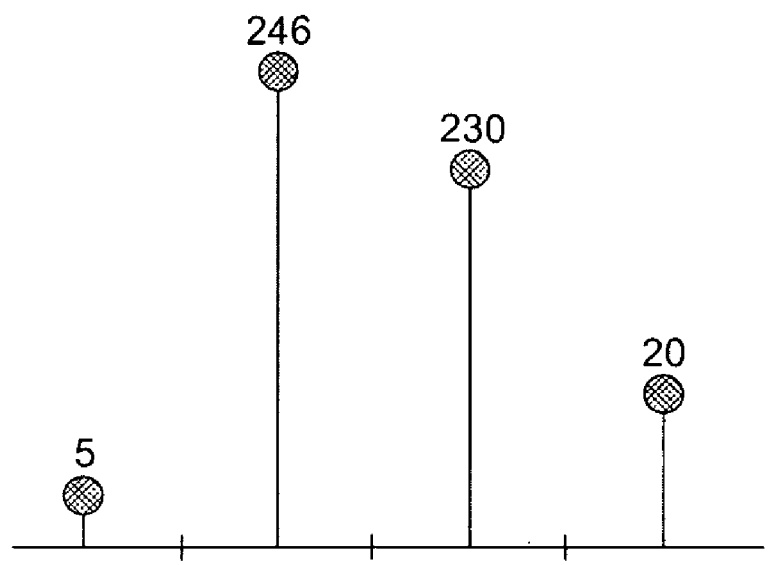
FIG. 3A shows an input image with four base pixel values of 5, 246, 230, and 20.

Reference is now being made to FIG. 3A which shows an input image with four pixels. These pixels have base pixel values of 5, 246, 230, and 20. These will be process according to the method hereof.

Figure 3B:
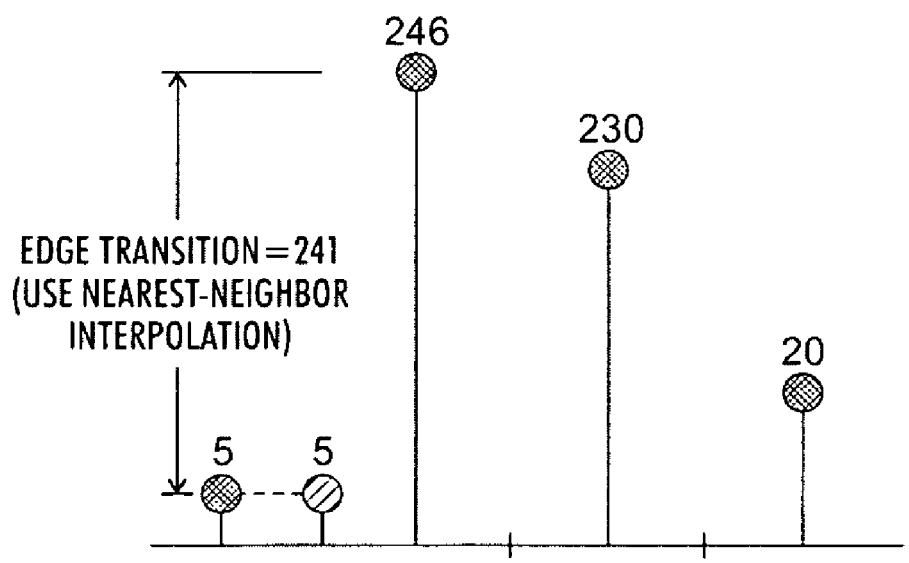
FIG. 3B illustrates the results of the processing of the first sub-pixel of FIG. 3A.

Reference is now being made to FIG. 3B which illustrates the process of the first pixel of FIG. 3A. The edge transition delta is calculated by subtracting the base pixel value of 246 from the base pixel value of 5. The determined edge transition delta is 241 (246−5=241). This is greater than the predetermined edge transition threshold of 200. Thus, a nearest-neighbor interpolation technique is used to determine the sub-pixel value of 5. In this case, the sub-pixel video delta would be set to zero (as per the MUX of FIG. 2).

Figure 3C:
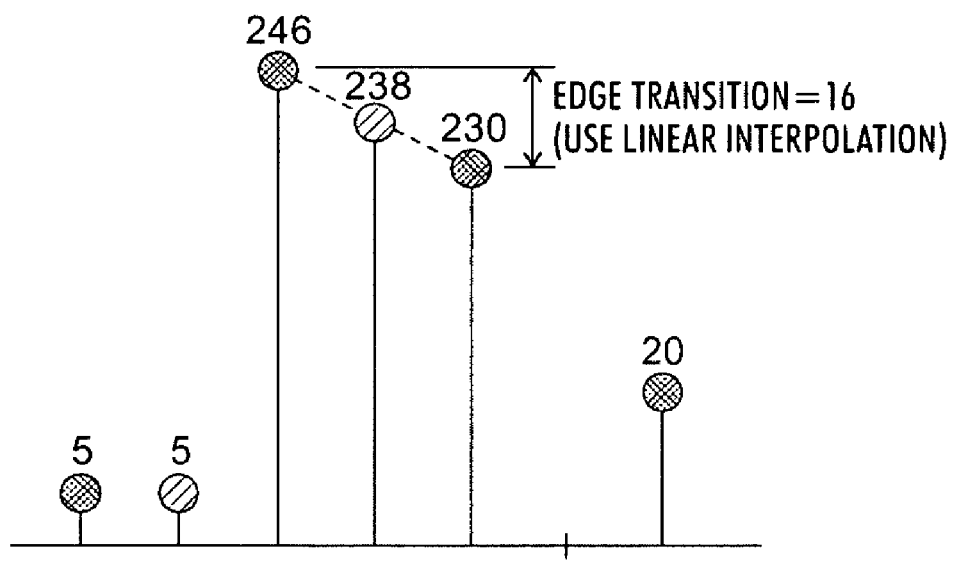
FIG. 3C illustrates the continued processing of the pixels of FIG. 3A.

Reference is now being made to FIG. 3C which illustrates the continued processing of the pixels of FIG. 3A. The edge transition delta is determined from the 2$^{nd}$ and 3$^{rd}$ base pixel values (246 and 230, respectively). The determined edge transition delta is 16 (246−230=16). This is less than the predetermined edge transition threshold of 200. Thus, a linear interpolation technique is used to determine the sub-pixel value of 238.

Figure 3D:
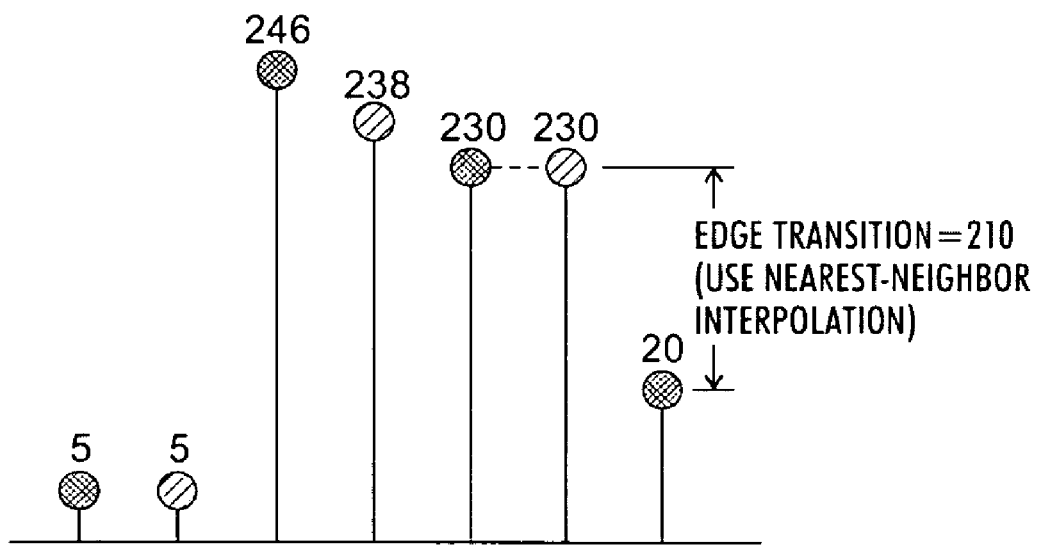
FIG. 3D illustrates the continued processing of the pixels of FIG. 3A.

Reference is now being made to FIG. 3D which illustrates the continued processing of the pixels of FIG. 3A. The third pixel's edge transition delta is calculated from the 3$^{rd}$ and 4$^{th}$ base pixel values (230 and 20, respectively). The determined edge transition delta is 210 (230−20=21). This is greater than the predetermined edge transition threshold of 200. Thus, a nearest neighbor interpolation technique is used to determine the sub-pixel value of 230.

Figure 3E:
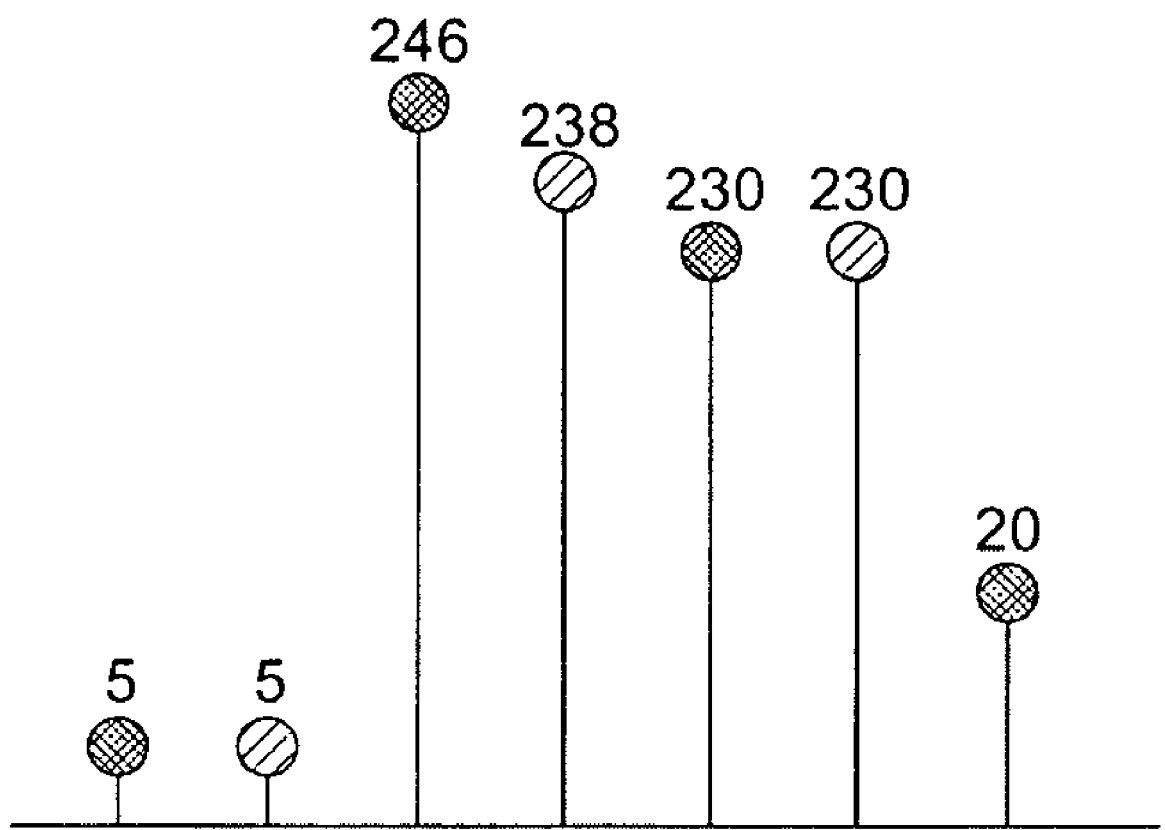
FIG. 3E illustrates the results of the example illustrated in FIGS. 3A-3D.

FIG. 3E illustrates the sub-pixel results of the example of FIGS. 3A-3D.

Figure 4:
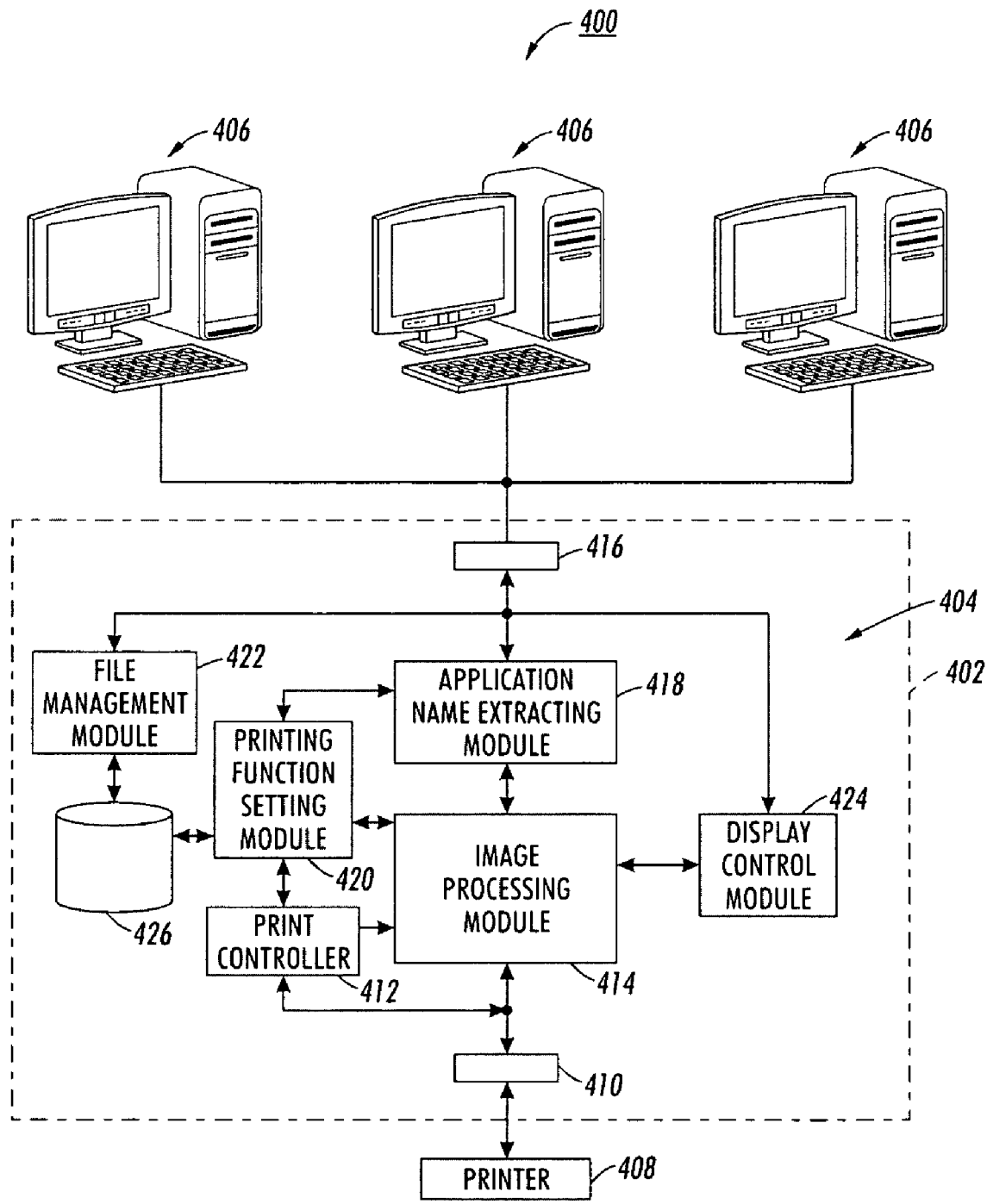
FIG. 4 is a schematic block diagram of a printing system applied to the present embodiment.

Reference is now being made to FIG. 4 illustrating a schematic block diagram of a printing system in which one or more embodiments of the present invention will find their intended uses.

The printing system 400 generally comprises a computer having a print server 402 and an image processing device 404. A document reproduction device, such as printer 408, is connected as an output device. In one embodiment, the image processing device is in communication with the print server. The print server has a general structure in which printing processing operations based on a set of drawing commands are carried out. The image processing device carries out printing processing on the basis of drawing commands from client terminals 406.

The image processing device carries out image processing on the basis of image data and drawing commands inputted from client terminals 406 in communication over a network. The client terminals are, for example, personal computers or workstations common to the arts and capable of performing image processing, such as generating, trimming, and image editing, through various applications. Various types of image manipulation applications such as, for example, PhotoShop, are performed by a use on the client terminal. Alternatively, a plurality of client terminals may be connected to the print server via a network such as a LAN, a WAN, or the like.

The print server in which the image processing device is provided has a general structure in which an external memory such as a ROM, a RAM, an HD, or the like is provided and the print server operates in accordance with an operation program stored in a ROM, and executes various image processes on system graphics, images, characters, tables, or the like. The print server is provided with input devices such as a keyboard, a mouse (neither are illustrated), or the like, and a display device such as a CRT display or the like. A two way interface 410 such as the Ethernet and a print controller 412 are provided. The print controller is connected to the printer via the two way interface.

An image processing module 414 generates raster data on the basis of image data and drawing commands inputted as a print job. Due to the raster data being controlled by the print controller and being outputted to the printer, a printed object based on the print job can be obtained.

A network interface 416 is provided. Drawing commands in accordance with an image file are inputted from the client terminals 406 via the network interface.

A page layout inputted from the client terminal to the print server may be in YMCK format, or RBG format, or may be such that both of these formats are used. In the image processing section, raster data of, for example, the respective colors of Y, M, C, K are generated from the print job, and are outputted to the printer.

An application name extracting module 418 and a printing function setting module 420 are provided. The application name extracting module receives a print job transmitted from the client terminal, and reads, from the print job, the name of the application which generated the page layout. The application name extracting module determines the name of the application which generated the page layout, by reading the application name recorded in the comments of the PostScript. The client terminal outputs a print job by using, for example, a PostScript driver.

A file management module 422 provides access to files and other data stored on storage device 426. The print function setting module may also access the storage device. Other modules may access the storage device as well as a disk controller, not shown. The display control module 424 provides various display capabilities to the image processing device 404.

Figure 5:
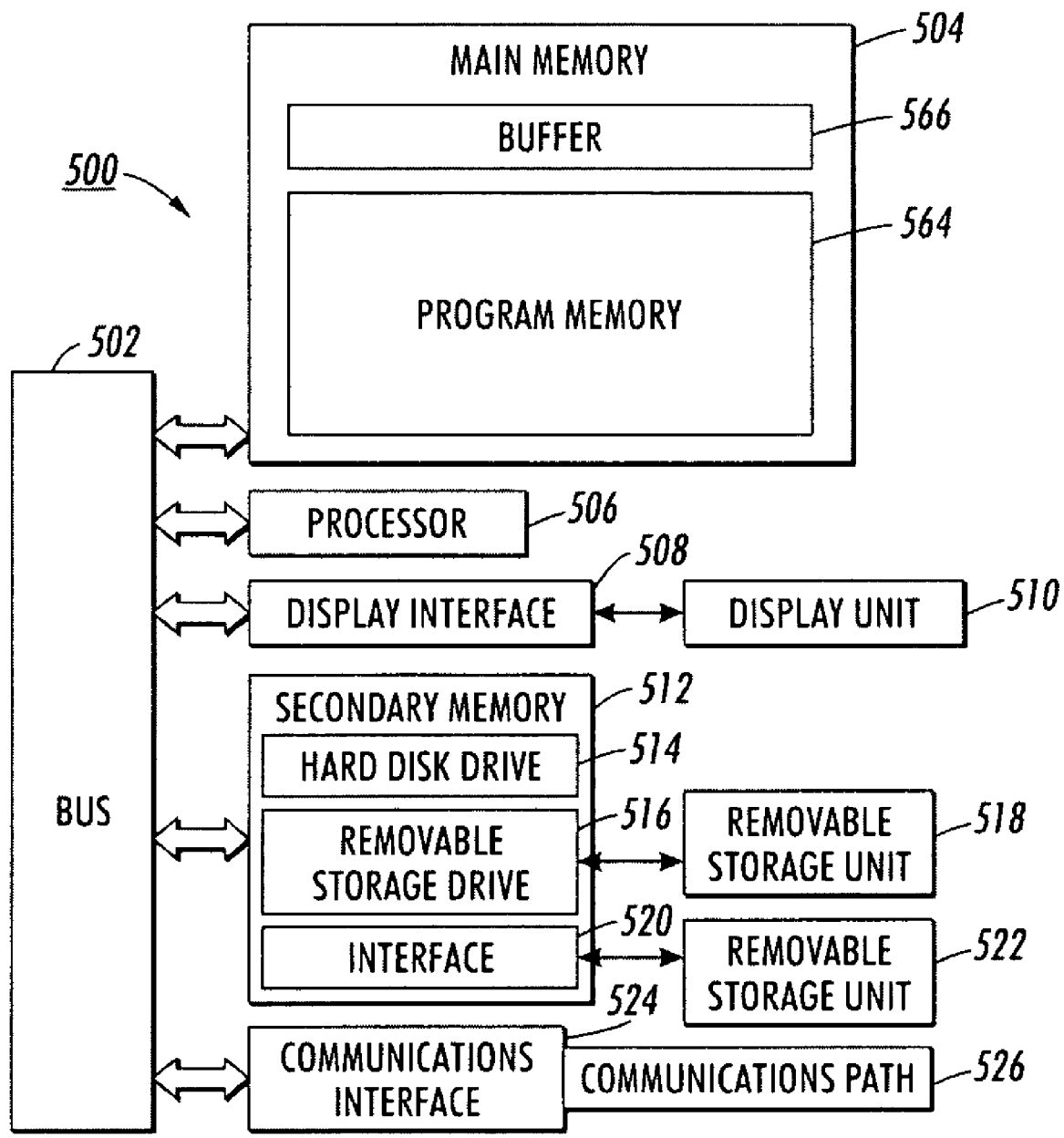
FIG. 5 is a block diagram of one embodiment of a computer system useful for implementing one or more of the embodiments of the present method.
Figure 6:
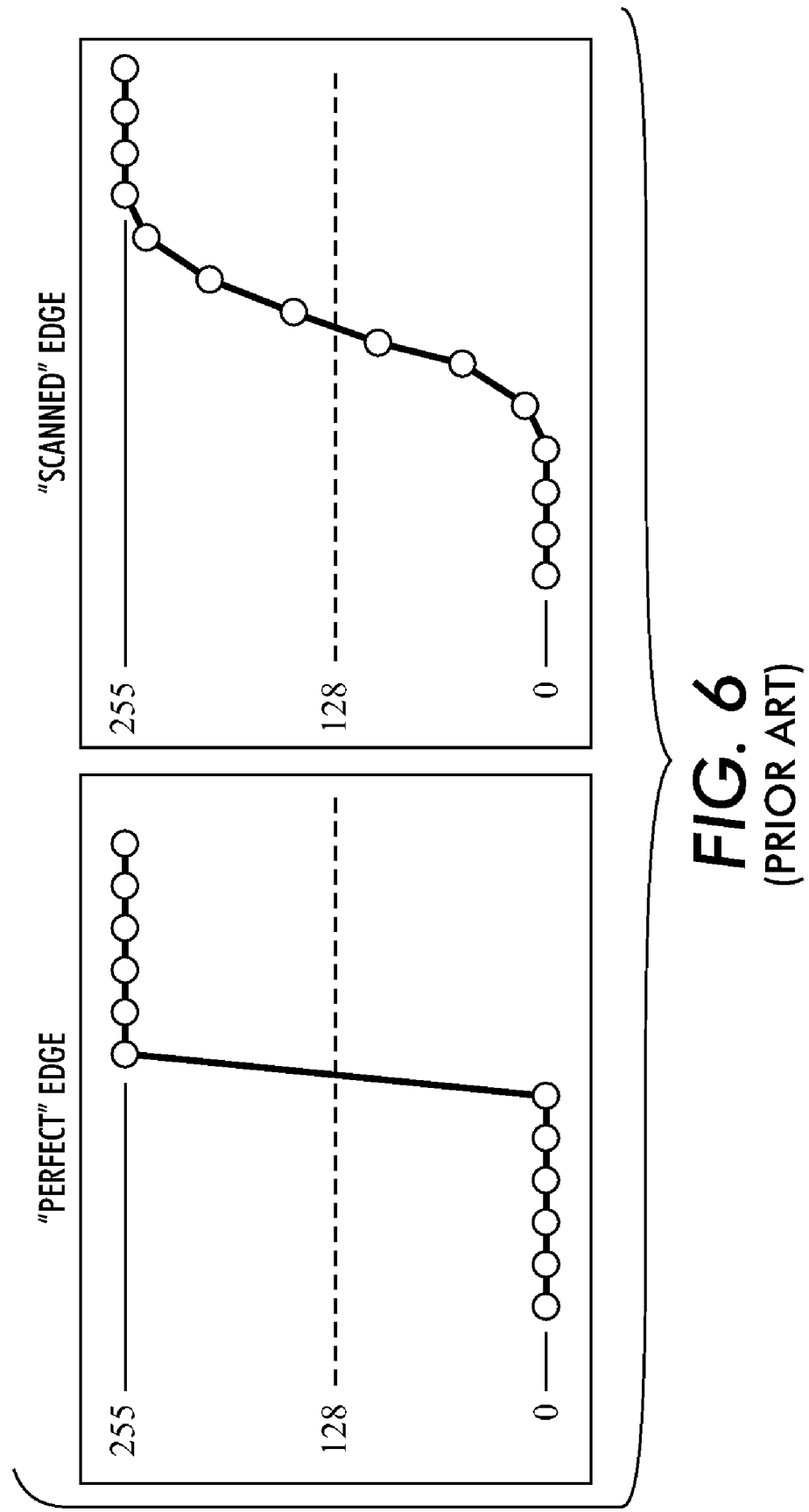
FIG. 6 is a prior art illustration of two video edge transition profiles wherein the first profile depicts a "perfect" edge, and the second profile depicts a "scanned" edge typically encountered in scanned images.
Figure 7:
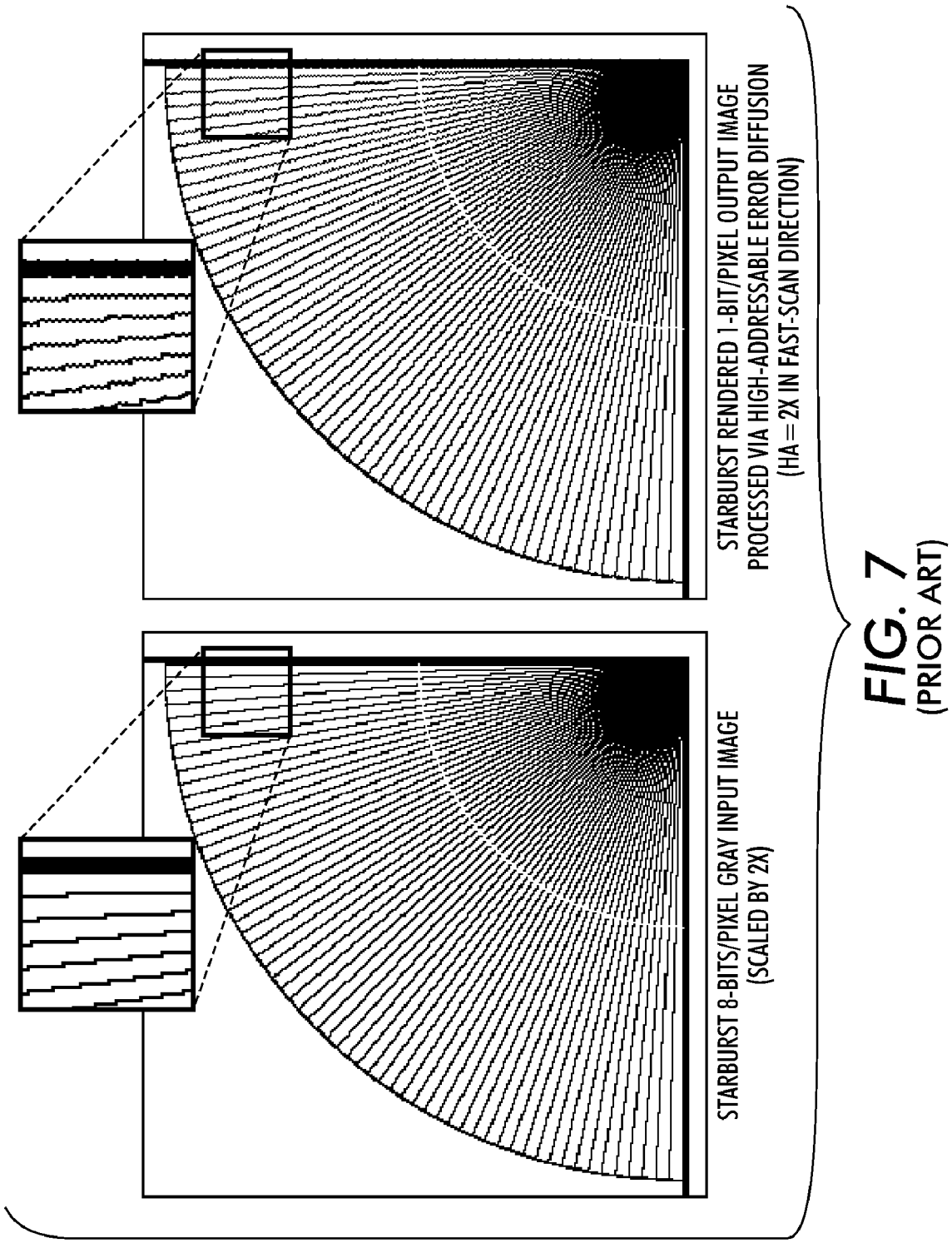
FIG. 7 is a prior art illustration of a binary input image (2A) and a binary output starburst input image (2B) rendered via a 2× high-addressable error diffusion method using a bit-constrained software model to show the sporadic placement of sub-pixels on either side of the vertically-oriented lines of output image 2B relative to the 8-bit gray input image 2B.
Figure 8:
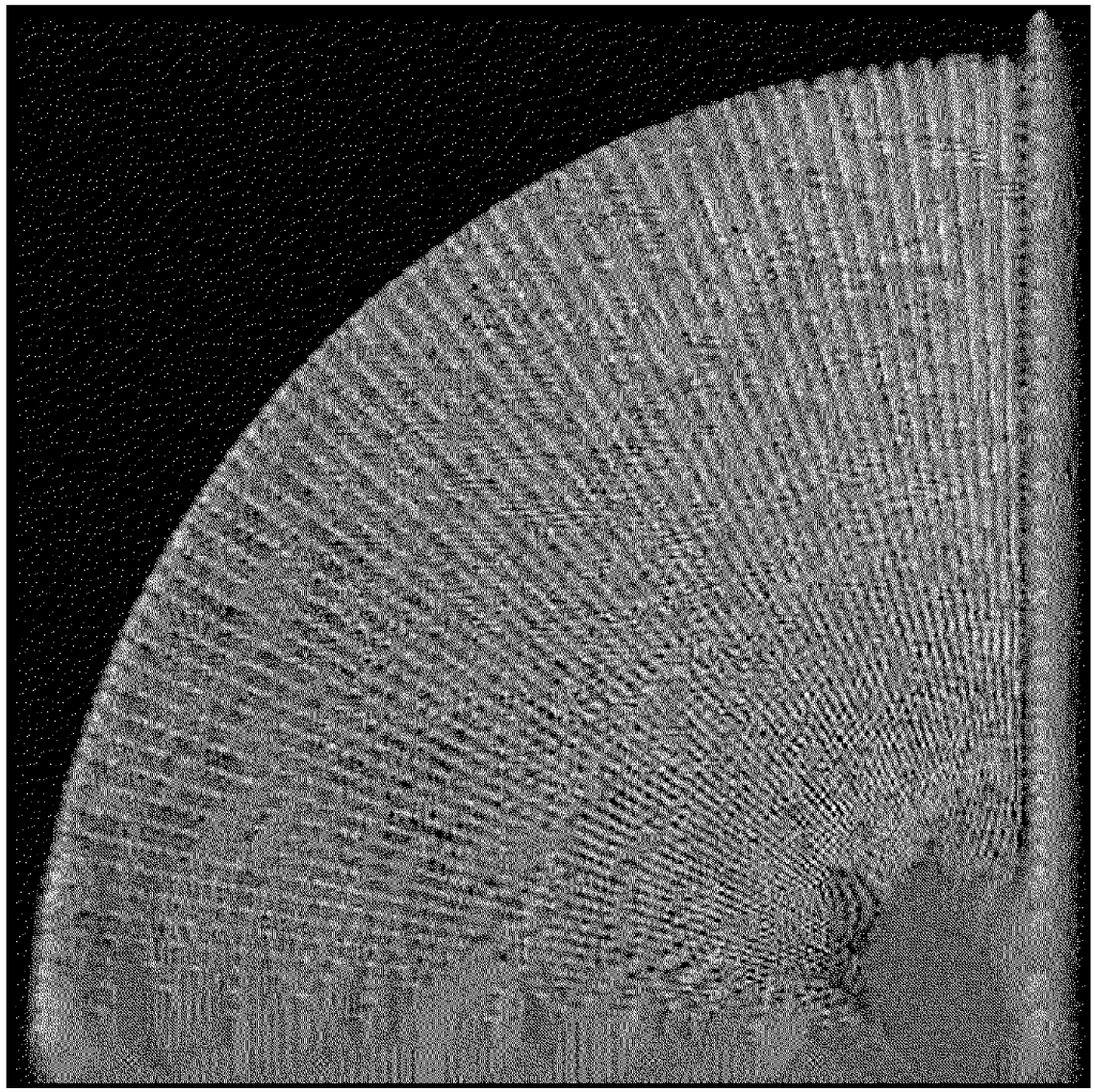
FIG. 8 is a prior art illustration of an error image which corresponds to the high-addressable rendered output of image 2B of FIG. 7.

Reference is now being made the system of FIG. 5 illustrating a block diagram of one embodiment of a computer system useful for implementing one or more embodiments of the present method.

The computer system 500 can be a xerographic system, a photocopier, or printing device. The computer system includes one or more processors, such as processor 506 capable of executing machine executable program instructions. In the embodiment shown, the processor is in communication with bus 502 (e.g., a backplane interface bus, crossover bar, or data network). The computer system also includes a main memory 504 that is used to store machine readable instructions to be executed by the processor. The main memory is capable of storing data used by or produced by the processor. The main memory may alternatively include random access memory (RAM) to support reprogramming and flexible data storage.

In the embodiment shown, main memory includes buffer 566 to temporarily store data for access by the processor, and a program memory 564 that includes, for example, executable programs that implement the methods described herein. The program memory is capable of storing a subset of the data that is less than all of the data contained in the buffer.

Computer system 500 includes a display interface 508 that forwards data from communication bus 502 (or from a frame buffer not shown) to display 510. The computer system also includes a secondary memory 512. The secondary memory may include, for example, a hard disk drive 514 and/or a removable storage drive 516 which reads and writes to removable storage unit 518, such as a floppy disk, magnetic tape, optical disk, etc., that stores computer software and/or data.

In an alternative embodiment, the secondary memory 512 includes other similar mechanisms for allowing computer programs or other instructions to be loaded into the computer system. Such mechanisms may include, for example, a removable storage unit 522 adapted to exchange data through interface 520. Examples of such mechanisms include a program cartridge and cartridge interface (such as that found in video game devices), a removable memory chip (such as an EPROM, or PROM) and associated socket, and other removable storage units and interfaces 520 which allow software and data to be transferred from the removable storage unit to the computer system.

The computer system 500 includes a communications interface 524 which acts as both an input and an output to allow software and data to be transferred between the computer system and external devices. Examples of a communications interface include a modem, a network interface (such as an Ethernet card), a communications port, a PCMCIA slot and card, etc.

Software and data transferred via the communications interface are in the form of signals which may be, for example, electronic, electromagnetic, optical, or other signals capable of being received by communications interface 524. These signals are provided to communications interface via a communications path 526 (i.e., channel) which carries signals and may be implemented using wire, cable, fiber optic, phone line, cellular link, RF, or other communications channels.

Terms such as, computer program medium, computer executable medium, computer usable medium, and computer readable medium, are used herein to generally refer to media such as main memory 504 and secondary memory 512, removable storage drive 516, a hard disk installed in hard disk drive 514, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions. Furthermore, the computer readable medium may comprise computer readable information in a transitory state medium such as a network link and/or a network interface, including a wired network or a wireless network, which allows a computer to read such computer readable information. Computer programs (also called computer control logic) may be stored in main memory and/or secondary memory. Computer programs may also be received via a communications interface. Such computer programs, when executed, enable the computer system to perform the features and capabilities provided herein.

It should also be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described herein. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for edge transition detection in a high-addressable error diffusion environment, the method comprising:
   scanning an image to obtain a plurality of pixels;
   identifying a local pixel and a neighbor pixel to said local pixel;
   determining an edge transition delta between said local pixel and said neighbor pixel;

comparing said edge transition delta to a predetermined edge transition threshold;

in response to said edge transition delta being less than said predetermined edge transition threshold, determining an intermediate sub-pixel using a linear interpolation on said local pixel; and detecting an edge transition based on said determined intermediate sub-pixel.

2. The method of claim 1, further comprising, in response to said edge transition delta being greater than or equal said predetermined edge transition threshold, determining an intermediate sub-pixel using a nearest neighbor interpolation on said local pixel.

3. A system for edge transition detection in a high-addressable error diffusion environment, the system comprising:

a storage medium capable of storing data; and a processor in communication with said storage medium, said processor capable of executing a machine readable instruction for performing the computer-implemented method of:

scanning an image to obtain a plurality of pixels;

identifying a local pixel and a neighbor pixel to said local pixel;

determining an edge transition delta between said local pixel and said neighbor pixel;

comparing said edge transition delta to a predetermined edge transition threshold;

in response to said edge transition delta being less than said predetermined edge transition threshold, determining an intermediate sub-pixel using a linear interpolation on said local pixel; and detecting an edge transition based on said determined intermediate sub-pixel.

4. The system of claim 3, further comprising, in response to said edge transition delta being greater than or equal to said predetermined edge transition threshold, determining an intermediate sub-pixel using a nearest neighbor interpolation on said local pixel.

5. A computer program product for edge transition detection in a high-addressable error diffusion environment, the computer program product comprising:

a non-transitory computer readable medium for storing instructions that, when executed on a computer, cause the computer to perform a computer-implemented method comprising:

scanning an image to obtain a plurality of pixels;

identifying a local pixel and a neighbor pixel to said local pixel;

determining an edge transition delta between said local pixel and said neighbor pixel;

comparing said edge transition delta to a predetermined edge transition threshold;

in response to said edge transition delta being less than said predetermined edge transition threshold, determining an intermediate sub-pixel using a linear interpolation on said local pixel; and detecting an edge transition based on said determined intermediate sub-pixel.

6. The computer program product of claim 5, further comprising, in response to said edge transition delta being greater than or equal to said predetermined edge transition threshold, determining an intermediate sub-pixel using a nearest neighbor interpolation on said local pixel.

* * * * *